July 7, 1953  G. V. CALABRESE  2,644,478
CONTROL MEANS FOR COFFEE-MAKING APPARATUS
Filed Aug. 11, 1949  2 Sheets-Sheet 1

INVENTOR.
George V. Calabrese
BY
Sheridan, Davis & Cargill
Attys

July 7, 1953          G. V. CALABRESE          2,644,478
CONTROL MEANS FOR COFFEE-MAKING APPARATUS
Filed Aug. 11, 1949          2 Sheets-Sheet 2

*Fig. 5*

INVENTOR.
George V. Calabrese
BY
Sheridan, Davis & Cargill
Att'ys

Patented July 7, 1953

2,644,478

UNITED STATES PATENT OFFICE 2,644,478

CONTROL MEANS FOR COFFEE-MAKING APPARATUS

George V. Calabrese, Chicago, Ill., assignor to Lumenite Electronic Company, Chicago, Ill., a corporation of Illinois Application August 11, 1949, Serial No. 109,761

2 Claims. (Cl. 137—263)

This invention relates to improvements in control means for coffee making apparatus.

In restaurants and other eating places coffee making urns frequently are employed for making coffee in relatively large quantities. In many such installations the apparatus consists of two urns and a hot water tank in the latter of which water is heated to 212° F. or the like and thereafter is transferred to one of the urns within which it drips into a strainer or filter holding the ground coffee. When the tank has again been replenished with water and the latter heated to the proper temperature, it may be directed, when required, into the second urn for making coffee in like manner. Generally such apparatus is provided with hand operable valves in the connecting water pipes whereby an attendant can cause the water from the tank to flow to the desired urn. Such manual control requires that the flow of water into an urn be shut off at the proper time to avoid flooding or overflowing of an urn with resultant loss of some of the coffee brew. Considerable time is thus required in checking the temperature of the water in the heating tank and operating the manual valve or valves, in operating the apparatus in the usual way. Generally a waitress who has other duties to perform attends to the operation of the apparatus. In accordance with the present invention the operation of the water control valves is controlled electronically in response to varying conditions whereby hot water from the tank will be directed selectively in one urn or the other and the flow of water will be shut off when the liquid in the urn reaches a predetermined level, thereby avoiding overflowing. Likewise, after water has been transferred from the tank to an urn as above stated, the water intake valve of the tank will be automatically opened to admit water in the tank to a selected level for heating preparatory to transfer to a second urn. The improved control circuit is provided with a thermostatic switch which precludes the transfer of water from the tank to an urn except when the water is at a predetermined coffee brewing temperature.

The principal object of the invention is to provide an electrical control circuit for coffee brewing operations which is semi-automatic in operation in that an operator is required only to press a button or operate a switch for initiating the functioning of the apparatus while the control circuit automatically shuts off the flow of water into an urn or into the tank when the water therein reaches a predetermined level. Hence with the improved control apparatus, overflowing of the urns is avoided, the water tank is automatically replenished with water to be heated for use in making a succeeding batch of coffee, transferring water from the tank to an urn before the water in the tank has reached a predetermined temperature is prevented, and the usual close attention of an attendant in the opening and closing of valves in preparing batches of coffee in the conventional urn type apparatus is not required.

Other objects of the invention are to provide co-ordinated circuits for effecting control of coffee making apparatus of the type mentioned and to provide improved electrodes which are included in the circuits for initiating the performance of certain control functions when water in a tank or urn reaches a predetermined level.

While the apparatus shown in the drawings for illustrative purposes comprises a water heating tank and two urns in which batches of coffee are brewed alternately, it will be apparent that the principles of the improvements may be utilized in controlling the functioning of brewing or like apparatus comprising a tank and a single urn or more than two urns.

In the accompanying drawings,

Fig. 5 is a diagram of the control circuit.

Figure 1:
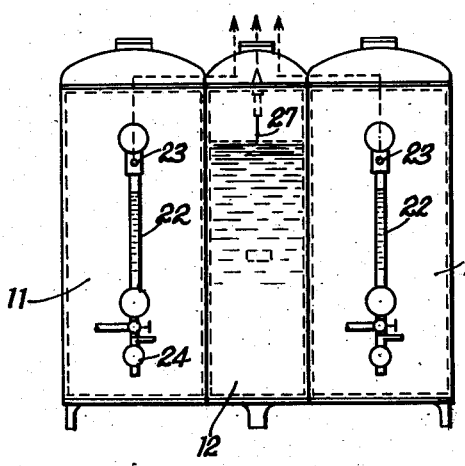
Figure 1 is a front elevation of coffee brewing apparatus of a type adapted to be controlled by the present improvements.
Figure 2:
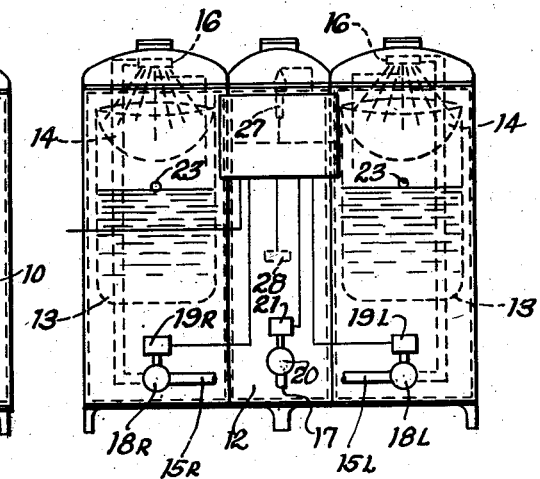
Fig. 2 is a rear elevational view of the apparatus shown in Fig. 1.

In Fig. 1 of the drawing, coffee brewing apparatus of generally conventional form is shown comprising a right urn 10, a left urn 11 and an intermediate water heating tank 12 which may be gas fired or heated by electricity if desired. As shown in Fig. 2, each urn is provided with an inner brew holding vessel 13, usually of glass and over the upper open end of which cloth filter bags 14 are adapted to be positioned and to hold a selected quantity of ground coffee. In brewing coffee in one of the urns, hot water from the tank is delivered through a pipe 15 to a spray head 16 above the respective vessel whence it is sprayed or drips upon the ground coffee and passes through the same forming the coffee brew and collects within the vessel. Pressure generated in the tank 12 by the boiling of the water displaces the water in the tank to the selected vessel when a control valve has been opened. A valve controlling the flow of water into the tank through pipe 17 is closed except during replenishment of the tank.

As shown in Fig. 2 the pipes 15 are provided with control valves 18 that are self-closing and are opened by solenoids 19 upon energization of the latter. A self-closing valve 20 of pipe 17 likewise is adapted to be opened by a solenoid 21 for controlling flow of water into the tank 12.

The urns are provided with liquid level gauge glasses 22 connected with the respective brew containing vessels and serve to visually indicate the level of the brew within the respective vessels. Each gauge glass structure is provided with an electrode 23 positioned in a fitting of the upper portion of the gauge, an end of each electrode being exposed to contact with liquid in the gauge as the liquid rises to a given level predetermined by the location of the electrode itself. The electrodes are insulated from the supporting structure and form parts of the control circuit for the respective urns as hereinafter explained.

Each urn is provided with a spigot 24 or the like by means of which coffee brew can be drawn as required.

The improved control means is adapted to perform the opening functions of the valves of the tank and urns that heretofore have been done by an attendant of the usual manually controlled brewing apparatus. Assume for instance that the tank has been filled with water and has been heated to the proper temperature (usually 212° F.) and that the next batch of brew is to be prepared in the right hand urn of Fig. 1. The attendant will operate a selector switch 25 to the R position (if not previously so actuated) which places the right hand tank under control of the control circuit and presses a self-opening starting switch 26 of the push button type shown in the circuit diagram, Fig. 5. The effect of the foregoing switch operations is automatically to cause the R valve 18 (R for right, L for left) to be opened by energization of the respective solenoid 19, to permit the pressure in the tank to displace water therein through the pipe 15 (R) to the spray head in the R urn. As the level of the brew rises to the level of the exposed end of the electrode 23 (R), the solenoid 19 (R) will be de-energized and the valve 18R will be permitted to close by spring action, thus terminating the delivery of water from the tank to the urn. The control circuit will then automatically open the intake valve 20 of the tank by effecting energization of the solenoid 21 to permit water to flow into the tank through pipe 17 which is connected to a city water line. When the water has risen in the tank to a selected level predetermined by the position of the exposed end of an electrode 27 within the tank, the control circuit will effect de-energization of the solenoid 21, permitting the valve 20 to close.

In the usual course of events the operator will thereafter prepare the L urn for brewing a second batch of coffee by placing ground coffee within the filter 14 of that urn. She will operate the selector switch 25 to the L position and press the starting button 26 when she wishes the brewing operation to begin. If the water in the tank is not at the proper temperature when she presses the starting button 26, a thermostatic switch or regulator 28 in the tank will be open and the control circuit will not then function to open the L valve 18. However, a visual signal in the form of a light that indicates initiation of a brewing operation will not be energized in the instance mentioned and the operator will know, by failure of the signal to appear, that the temperature of the water in the tank is too low for brewing purposes. When the starter button is pressed after the water in the tank has reached the prescribed temperature, the water from the tank will be forced into the L urn, and when the level of the brew in the urn contacts the high level electrode in the urn the flow of water will be halted and the flow of water into the tank will begin for restoration of the water level in the tank to that determined by the position of the electrodes 27 as above described.

Figure 5 of the drawing discloses the control circuit by means of which the above described operations of the brewing apparatus are effectuated. In the circuit diagram two supply conductors 30, 31 are shown for supplying current to the control circuit. Conductor 30 is connected to a line relay 32 connected by wire 33 through the starter switch 26 to wire 34 extending to one terminal of the switch 25 shown for illustrative purposes as a multiple contact throw switch. Through a blade 35 of the switch the terminal can be connected electrically to the conductor 31 when the selector switch 25 blades have been moved to the upper or right (R) position. When the switch 25 is in the lower or left (L) position a jumper wire 36 directs current to conductor 37, thence to the blade 35 and to conductor 31 completing the circuit through the winding of the line relay 32 for energizing the same. Hence whenever the push button 26 is actuated while the selector switch 25 is in either of its two closed positions, the line relay will be energized provided the temperature of the water in the tank 12 is sufficiently high to have closed the thermostatic regulator switch 28. The closing of the starter switch 26 not only momentarily closes the line relay, but by leads 38, 39 energizes the primary of the transformer 40 also, lead 38 being shown as an extension from conductor 30 while wire 39 connects the primary of the transformer 40 with the conductor 37 whereby the circuit of the transformer primary winding is completed to lead 31 through jumper 36 when the selector switch 25 is in the R position or directly through the blade 35 when the selector switch is in the L position.

Energization of the line relay 32 swings the self-opening switch arm 41 into contact with the terminal 42 and swings switch arm 43 out of contact with the contact 44 into contact with contact 45, the arm being self-actuating to the right into contact with contact 44 whenever the relay is de-energized. While the closing of the circuit of the relay by the starter button is only momentary, the relay is retained in closed relation if the temperature regulator switch 28 is closed. Assuming the arm 41 has been moved to the dotted line position into contact with the contact 42 and that arm 43 has been moved into contact with the contact 45, the circuit of the relay 32 will remain energized by reason of the closed circuit comprising conductor 30, 33, 46, arm 41, conductor 47, relay arm 48 (then in the dotted line position) and conductors 49, 50 and 37 which, as above mentioned, will be electrically connected to lead 31 through the switch 25 when in either of the closed positions. A relay 51 is shown of which arm 48 is a part, the relay when energized, as later described, moving the arm 48 to the dotted line position for holding the line relay closed following momentary operation of the starter switch 26.

The arm 43 of the line relay 32 when in the dotted line position effects energization of the solenoid R19 or L19 for opening the respective valve 18 (depending on the closed position R or L of the selector switch 25) to permit water to flow from the tank to the selected urn. Assuming that the selector switch is in the closed position R (right), the movement of the arm 43 to the dotted line position will effect energization of the solenoid R19. The circuit through the solenoid R19 may be traced as follows: from lead 30 current flows through conductor 52, arm 43, conductors 53, 54, 55 and 56 to the middle blade of switch 25, jumper 57 to lead 31. A signal switch 58 (RS) in the form of an incandescent lamp will lighted concurrently with the energization of the solenoid R19 through conductors 59 and 60 thus indicating to the operator that the operation of the starter switch 26 has effected the closure of the R19 solenoid which results in the flow of water into the right urn 10.

In the event the selector switch 25 is in the L position when the line relay is closed by the actuation of the starter switch 26, the solenoid L19 will be energized to admit water from the tank into the left hand urn 11. Thus from conductor 53 current will flow through conductor 63 to the solenoid L19, and through conductor 61 to a signal lamp 62, to conductor 64 from which it flows through the middle blade of switch 26 through jumper 57 to the lead 31.

After either solenoid valve R19 or L19 has been energized to open the respective valve 18 for admitting water to the respective urn, the solenoid remains energized so long as the holding circuit through the relay 51 remains closed, that is, so long as arm 48 is in the dotted line position. This relay 51 is energized by plate current from the electron tube 65, shown for illustrative purposes as of the hot cathode type and having a heating filament 66, a control grid 67, and plate 68. The filament is heated from the secondary F of the transformer while the transformer secondary P supplies current to the plate 68. The plate circuit includes the winding of the relay 51 and may be traced from one terminal of the secondary as follows: conductors 69, 70 to the filament terminal, plate 68, conductor 71, coil of relay 51 and conductors 72 and 73 to the other terminal of the secondary P. The closing of the relay 51 occurs when the starter button 26 is momentarily closed as above described, thus holding the line relay 32 closed following release of the button 26, provided the thermostatic switch 28 also is closed. Thus water from the tank continues to flow into the selected urn but when it reaches the level in the urn determined by the position of the respective electrode 23 the relay 51 will be de-energized through the action of the grid 67 of tube 65, thus permitting the line relay 32 to open by spring action and effecting de-energization of the respective solenoid 19 and permitting the associated valve 18 to close and stopping the flow of water into the selected urn.

The grid circuit, to which control voltage is applied by the transformer secondary G, is grounded at 74 to a portion of the brewing apparatus and includes a bridge 75 that is balanced except when coffee brew contacts the high level electrode 23 of the respective urn. In the diagram the secondary G is shown connected by conductors 76 and 77 to terminal 78 between adjacent resistors. Contact 79 is connected by conductor 80 to the terminal of the grid 67 from which extends conductor 81 to a contact of the selector switch 25 which, when in the R position, places the high level electrode 23 of the right urn in the grid circuit and when in the L position places the high level electrode 23 of the left arm in the grid circuit. The bridge 75 is provided with a ground 82 as shown. As stated, the bridge normally is in balance with no voltage applied to the grid. When, however, the water or coffee brew contacts the high level electrode 23 in the respective urn, the resistance of the circuit through the resistor 83 is decreased by reason of the better conductive path provided by the liquid between the electrode and the ground, thereby unbalancing the bridge, imposing a negative potential on the grid and interrupting the plate current, thus de-energizing the relay 51 and permitting the line relay to open. Opening of the line relay causes the control valve of the respective urn to close, shutting off the flow of water to the urn.

When the water to an urn has been shut off, as just above described, it is desirable that the water intake valve 20 of the water tank be opened to replenish the supply therein in preparation for use in the other urn. This result is accomplished by the control circuit as next described.

A second electron tube 85 is provided, the plate current from which flows through conductor 86, coil of relay 87, conductors 88, 89, 73 to the secondary P. The other side of the secondary is connected to the filament of the tube through conductors 69 and 90. Hence whenever the starter switch is closed to energize the line relay 32 (the thermostatic switch 28 being closed) not only does the tube 65 effect closure of the relay 51, but tube 85 effects closure of the relay 87 by moving the arm 91 thereof from the full line to the dotted line position. When line relay 32 is closed, current does not flow through the arm 91 of the relay 87 notwithstanding that the arm will be in contact with the contact 92 for the reason that the arm 43 of the line relay 32 is in the dotted line position when the relay 32 is energized. The relay 87 controls the energization of operating solenoid 21 of the self-closing intake valve 20 of the tank 12 and hence while water is being delivered from the tank to one of the urns the intake valve 20 remains closed. When the relay 32 is de-energized, as above described, for shutting off the flow of water to an urn, the movement of the arm 43 of the line relay 32 to the full line position permits current to flow from conductor 52, through arm 43, conductor 93, arm 91, conductor 44, solenoid 21, conductor 94 to conductor 37 and thence through the selector switch 25 (whether in the R or L positions) to line 31. The resulting energization of solenoid 21 opens the tank intake valve and permits water to flow into the tank until it reaches the level determined by the position of the high level electrode 27 therein when by operation similar to that described above, the balanced bridge 95 becomes unbalanced, placing a negative potential on the grid of the tube 85 and interrupting or so decreasing the plate circuit of the tube as to de-energize the relay 87 and thereby opening the circuit of the solenoid 21 and permitting the intake valve 20 of the tank to close.

It will be seen that the control circuit described is adapted for controlling the functioning of the water valves of the tank and urns without attention by the operator other than to operate the selector switch 25 for selecting the urn next to be used and pressing the starter button 26 when she desires the coffee making operation to begin in the selected urn. The control circuit automatically stops the flow of water to the particular urn selected when the water rises to the level determined by the respective high level electrode and that immediately thereafter water is supplied to the tank to be heated preparatory to brewing coffee in the other urn when required.

Figure 3:
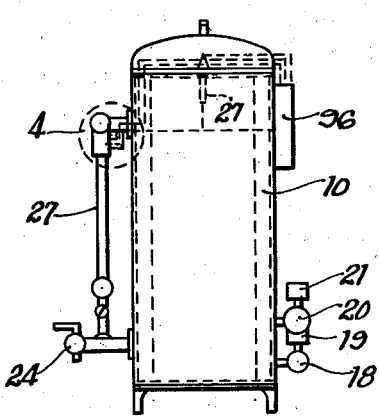
Fig. 3 is an end elevational view of the apparatus.
Figure 4:
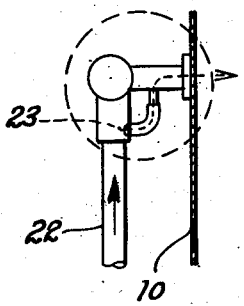
Fig. 4 is a broken, enlarged view of a liquid level gauge glass of one of the urns showing a control circuit electrode associated with the gauge.

In Fig. 3 a casing 96 is shown mounted at the rear of the apparatus that houses the electron tubes, relays and elements of the control system.

While I have shown the circuit in the presently preferred form in connection with a coffee brewing apparatus comprising a water heating tank and two associated urns, it will be obvious that the control means may be used advantageously with brewing apparatus employing a heating tank and but one urn. The principles of the improvements may be of utility in relationships other than as described above and hence I do not wish to be restricted to the specific disclosures hereof except as so limited by the appended claims.

I claim:

1. Electrical control means for coffee brewing apparatus comprising a pair of brewing urns, a hot water tank for heating water to be supplied in succession to the urns, a pair of ducts each for delivering water from the tank to one of the urns, a third duct for supplying water to the tank, each of said ducts being provided with a self-closing valve, said control means comprising electrically actuable devices for opening the valves, an electrode for each urn and for the tank located at the high level of liquid therein, and electric circuits for effecting energization of said actuable devices for the urns including a selector switch operable manually to either of two positions for rendering a respective device operable upon closing of a starter switch, a self-opening starter switch operable manually for effecting energization of the selected one of said devices for opening the corresponding control valve for admitting water to the corresponding urn, a holding circuit for retaining the circuit of said device closed until the water has reached the level of and contacted the responsive electrode in the urn, means for automatically opening said holding circuit upon contact of water in the urn with said electrode for permitting the respective valve to close and concurrently effecting the supplying of current to the said device for opening the valve of said tank to permit the flow of water into the tank, and a circuit including said electrode in the tank for effecting the de-energization of said last mentioned device upon the contacting of the water in the tank with said electrode.

2. Electrical control means for coffee brewing apparatus comprising a water heating tank, a pair of coffee brewing urns, a pair of conduits each for delivering hot water from the tank to one of the urns, a conduit for supplying water to the tank to be heated, a self-closing valve for each of said conduits, said control means comprising a pair of electrically actuable devices each for opening a valve of said pair of conduits and a third electrically actuable device for opening the valve of the water supply conduit of the tank, a circuit for said devices provided with switch means adapted to be operated manually to either of two positions for effecting the selection of the device of said pair of devices to be energized, a normally open line relay adapted to be closed for supplying current to the circuit of the selected device for opening the respective valve for causing hot water to flow from the tank to the respective urn, a self-opening manually closable switch for effecting the momentary closure of said relay, a holding circuit closed by said momentary closure of said relay including a second normally open relay, and an electronic tube having plate circuit for closing said second relay upon closure of said first relay whereby said selected device remains energized during the period of closure of said first relay, an electrode for said selected urn having a portion exposed to contact with the water in the urn as the water reaches a predetermined level, a grid circuit including said electrode adapted to interrupt said plate circuit upon contact of the water with said electrode for effecting de-energization of said second relay for opening said holding circuit and de-energizing said first relay and thereby opening the circuit of said selected device to permit the said selected valve to close, a second electronic tube energized upon closing said first relay and provided with a third normally open relay in the plate circuit thereof adapted to be closed upon energization of the tube, a circuit including said third relay and said tank valve operating device adapted to be closed upon the opening of said first relay for effecting actuation of said last mentioned device for permitting water to flow into said tank, an electrode in said tank having a portion exposed to contact with the water in the tank as the latter rises to a predetermined level therein, and a grid circuit for said second tube including said second electrode adapted to interrupt the plate circuit of said second tube upon contact of the water in the tank with said second electrode for effecting the de-energization of said device for permitting said valve to close to arrest the in-flow of water to the tank.

GEORGE V. CALABRESE.

References Cited in the file of this patent

UNITED STATES PATENTS

| Number | Name | Date |
| --- | --- | --- |
| 2,488,817 | Kaminky | Nov. 22, 1949 |